June 3, 1947.    G. MOCHAN    2,421,388
FOLDABLE BABY CARRIAGE
Filed Jan. 25, 1945    2 Sheets-Sheet 1
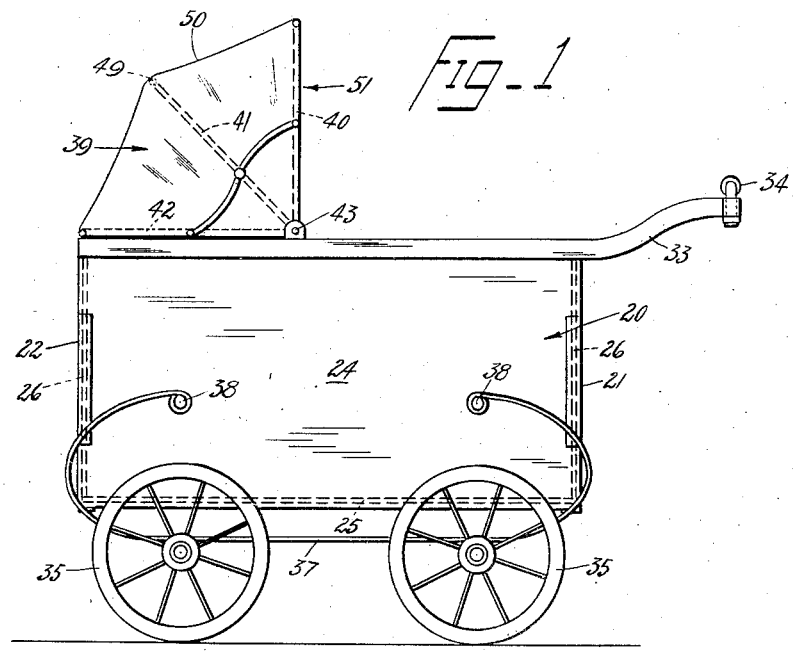
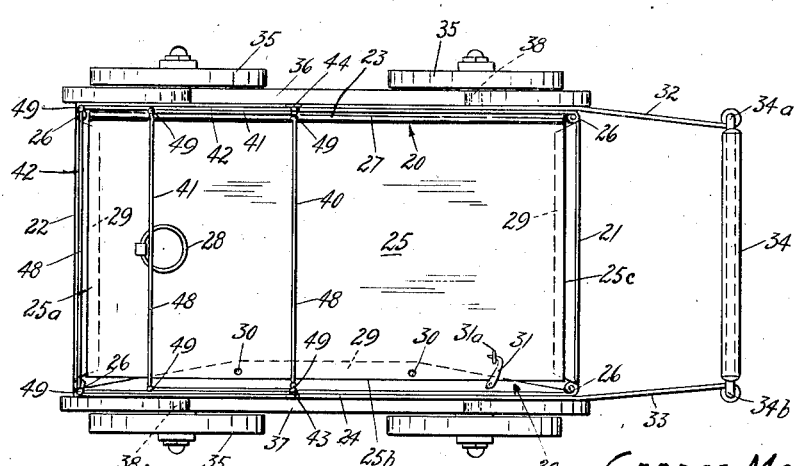
GEORGE MOCHAN,
INVENTOR.
BY: Julian J. Wittel,
his attorney.

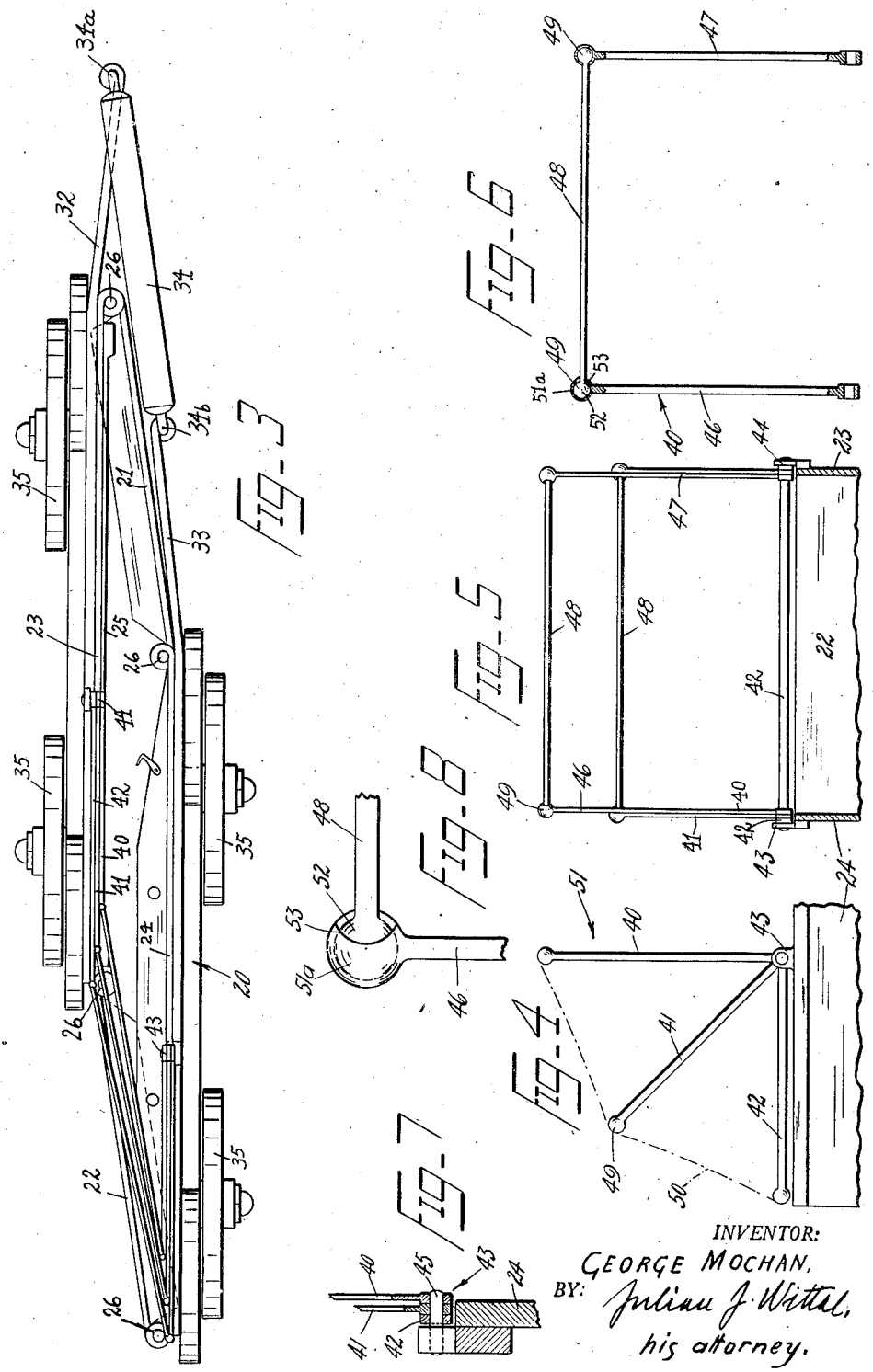

Patented June 3, 1947

2,421,388

UNITED STATES PATENT OFFICE 2,421,388

FOLDABLE BABY CARRIAGE

George Mochan, New York, N. Y.

Application January 25, 1945, Serial No. 574,480

6 Claims. (Cl. 296—107)

This invention relates to baby carriages, and has for its main object to provide a baby carriage which may be collapsed into a flat condition when desired.

As it is well known, the storing of a baby carriage over-night, and much more so, the storing thereof for a longer period, like years, presents a problem to the owner.

Baby carriages take up considerable room, are awkward to handle, to place and to store, and awkward to carry upstairs or downstairs, where necessary.

The present invention is an improvement on the United States Patent No. 2,180,642, issued to me on November 21, 1939, for a Foldable truck, and has for one of its objects to employ the principle of said patent to a baby carriage.

Another object of this invention is to provide a baby carriage which will have the usual appearance, construction and facilities, including a collapsible sun shade and springs between the body and the wheels, and which may be folded into a flat condition, as it is, easily, quickly and in an efficient manner, whereupon the baby carriage in such flat condition may be stored or carried about with great facility and requiring small space.

Still a further object of my invention is to provide a baby carriage as characterized hereinbefore, in which the sun shade may be permanently secured to the carriage and still be adapted to be folded into a flat condition therewith, or opened up into its normal position when the baby carriage is opened up for use.

In the drawings accompanying this specification and being made a part thereof:

Fig. 1 is a semi-diagrammatical simplified side elevation of the basic structure of my new collapsible baby carriage in a normal condition with its sun shade indicated expanded as when in use, and Fig. 2 is a plan view thereof in such a condition;

Fig. 3 is a plan view of my novel baby carriage in a flat collapsed condition, its sun shade being shown as collapsed and folded with it;

Fig. 4 is a diagrammatical side view of the sun shade frame structure in an open position, and Fig. 5 is a front view thereof, while Fig. 6 is a partly sectional view of a single frame element in the sun shade construction, and Figs. 7 and 8 show details of said sun shade construction.

Referring now to the drawings more in detail, by characters of reference, the numeral 20 indicates the body of the baby carriage, in general, said body being constructed on similar principles and in a similar manner, as the truck or vehicle body described in my said United States Patent, No. 2,180,642, and it may have a front wall 21, a rear wall 22, a right hand side wall 23, a left hand side wall 24, and a bottom 25, and, as it is described in said patent, pivots or hinge joints 26 are provided at the four corners of the device, between the front, rear and side walls, respectively, so that they may be turned on said pivots and collapsed or folded into a flat condition, as indicated in Fig. 3.

To permit this folding or collapsing of the device, the bottom 25 is hingedly connected, at one side thereof, to the side wall 23, as indicated at 27, being free around its three other margins 25a, 25b and 25c, so that it may be swung upwardly, as by grasping the grip or handle ring 28, and folded along the right hand side wall 23, as will be understood, and as it is described in said patent.

When the body 20 is in the normal, generally rectangular, position, shown in Figs. 1 and 2, the bottom 25 is swung downwardly into its normal position, resting on flanges 29 on the three walls of the body and it may also have apertures 30 through which appropriate pins project in one or more of the flanges 29, thereby to firmly fix the bottom on said flanges.

A releasable locking means 31 may also be employed between one of the flanges 29 and the bottom 25, a swingable hook being shown in Fig. 2, secured on a flange 29 and engaging the ring or eyelet 31a on the bottom 25, whereby the bottom may be firmly secured in its operative downwardly swung position and may be easily released therefrom when it is desired to swing it upwardly for folding the baby carriage. Of course, other similar securing means may be employed, like an automatic spring latch device between the bottom and the flange 29, while the device will operate even without such securing means between the bottom and the flange on the side wall since the gravity of the bottom 25 and the bedding thereon, and, indeed, the weight of the baby's body itself, will also have the tendency to keep the bottom 25 downwardly.

Two forwardly projecting arms 32 and 33 are also provided for pushing or propelling the device, having a cross bar or grip 34 between them, pivotally secured to them at its ends 34a and 34b, so that upon collapsing the baby carriage, the propelling arms with their cross rod will also be folded along one another, as indicated in Fig. 3.

In the embodiment of the baby carriage shown in Figs. 1 to 3, four wheels 35 are provided for the device, being secured in pairs at the right hand and left hand sides thereof, respectively. Elongated elliptical springs 36 and 37 may be secured on the respective side walls, as indicated at 38.

A sun shade, generally of the usual construction, and indicated by the numeral 39, is also secured to the rear portion of the top of the body 20, being composed, in the embodiment shown in the drawings, of three rectangular U-frames 40, 41 and 42, pivoted at their free ends on the tops of the respective side walls, as indicated at 43 and 44.

The pivot device, by which the respective free ends of the three U-frames are secured on pins 45 at the respective side walls, is shown in Fig. 7. Each U-frame is composed of a left hand side member 46, a right hand side member 47, and a top cross member 48, and ball joints 49 are provided between the ends of the side members 46 and 47, and the cross members 48, respectively, permitting the necessary relative movements for folding them generally along the planes of the side members when the baby carriage is collapsed, as will be understood.

The numeral 50 indicates, by dotted lines, the usual textile fabric, leather, or similar covering for the sun shade.

When it is desired to collapse or fold my baby carriage, the sun shade structure 39 thereof will be folded backwardly and downwardly over the top of the device, as usual, and as indicated by the arrows 51 in Figs. 1 and 4, its U-shaped members folding one on top of the other on the pivots 45, and the flexible covering 50 of the sun shade folding as usual. The bedding and other material will then be removed from the body 20 and the bottom 25 will be swung upwardly on the pivot or hinge 27 until it is folded along the right hand side wall 23, whereupon any possible fixing or locking element between the parts of the device is released, and its walls may be folded into the position indicated in Fig. 3, on the hinges 26, the cross rod or grip 34 folding on its pivots 34a and 34b, and the frames 40, 41 and 42 of the sun shade also folding into the position indicated in Fig. 3 by the relative movement of their side branches 46 and 47 and their cross branches 48 in the respective ball joints 49.

The covering 50 of the sun shade 39 (being indicated as removed in Figs. 2 and 3 for the sake of clearness) will follow the folding of its U-shaped frames.

Of course, baby carriage bodies of other types, styles, proportions and designs may be used than the simple one indicated in the drawings and their foldable or collapsible main structure may carry various ornamental elements to show a desired finished type or style, concealing the underlying rectangular pivoted foldable structure. Similarly, other types of springs may be used for the wheels of the device, and other arrangements of the wheels may be used, within the principle of my collapsible baby carriage.

The ball joints or pivots 49 between the parts of the U-shaped frame may have the construction illustrated in Figs. 6 and 8. The outer ends of pivoted arms 46 and 47 are formed into hollow balls 51a in which are rotatable balls 52 provided at the ends of cross rods 48. An appropriate window 53 is cut into the wall of the hollow sphere 51a around the end of rod 48 to permit the relative movement between the parts 48 and 46 and 47, respectively. Generally, the parts of the joints 49 may be comparatively loosely arranged so as to permit a play, adjustment and easy movement between them. When the bottom 25 is locked, the U-frames 40, 41 and 42 of the sun shade also will be automatically locked and secured against longitudinal flattening, even if some play and looseness is allowed in their joints 49.

The cover 50 of the sun shade structure also may be secured on it in a removable manner, as usual, like by snap buttons, so that before folding it may be removed, and again secured on the baby carriage when the same is opened up for the next use.

While I have shown preferred embodiments of my invention, it is to be understood that changes and variations may be resorted to in the elements, construction and combination of my invention, and I reserve my rights to such changes, variations and uses, as are within the spirit of this specification and the scope of the claims hereunto appended.

What I claim as new and want to protect by Letters Patent of the United States, is:

1. In a baby carriage, having a body adapted to be collapsed and folded into a flat condition, generally along the plane of one of its side walls, said carriage also having a sun shade, said sun shade comprising frames having two side and one cross members, said side members being pivoted in a longitudinal direction on the body of the carriage, a universal joint between each cross member and the respective side members, and a flexible covering secured on said frames.

2. In a baby carriage, having a body adapted to be collapsed and folded into a flat condition, generally along the plane of one of its side walls, said carriage also having a sun shade, said sun shade comprising frames having two side and one cross members, said side members being pivoted in a longitudinal direction on the body of the carriage, a universal ball joint between each cross member and the respective side members, and a flexible covering secured on said frames.

3. In a baby carriage, having a body adapted to be collapsed and folded into a flat condition, generally along the plane of one of its side walls, said carriage also having a sun shade, said sun shade comprising frames having two side and one cross members, said side members being pivoted in a longitudinal direction on the body of the carriage, a flexible covering secured on said frames, a universal joint between each of the respective cross and side members, said joint being formed by a hollow ball at the end of one of the respective members, and a solid ball within said hollow ball at the end of the other respective member, said hollow ball having a cut out portion to permit the necessary movement of the solid ball therein.

4. In a baby carriage, having a body adapted to be collapsed and folded into a flat condition, generally along the plane of one of its side walls, said carriage also having a sun shade, the combination of frames for said sun shade with a flexible covering thereon, said frames being adapted to be folded when the body of the carriage is folded, substantially into planes parallel with and close to the plane into which said body is folded.

5. In a baby carriage, as set forth in claim 4, said folding of the sun shade being automatically executed by the folding of the body.

6. In a baby carriage, as set forth in claim 4, said folding of the sun shade being automatically executed by the folding of the body, and the unfolding of the body and its return to its original position being adapted to cause the sun shade to return into its extended position so that its respective frame members will then bridge the respective portion of the top of the carriage.

GEORGE MOCHAN.

REFERENCES CITED

The following references are of record in the file of this patent:

UNITED STATES PATENTS

| Number | Name | Date |
|---|---|---|
| 168,647 | Krueger | Oct. 11, 1875 |

FOREIGN PATENTS

| Number | Country | Date |
|---|---|---|
| 17,669 | Great Britain | Sept. 1, 1905 |
| 196,144 | Great Britain | Apr. 19, 1923 |